US012053861B2

(12) United States Patent
Johnston

(10) Patent No.: US 12,053,861 B2
(45) Date of Patent: Aug. 6, 2024

(54) GOLF CLUB WRENCH WITH MULTI-PURPOSE TIP

(71) Applicant: Callaway Golf Company, Carlsbad, CA (US)

(72) Inventor: Logan K. Johnston, Vista, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 232 days.

(21) Appl. No.: 17/671,139

(22) Filed: Feb. 14, 2022

(65) Prior Publication Data

US 2023/0256571 A1 Aug. 17, 2023

(51) Int. Cl.

| | |
|---|---|
| ***B25B 15/02*** | (2006.01) |
| ***A63B 53/04*** | (2015.01) |
| ***A63B 57/00*** | (2015.01) |
| ***B25B 15/00*** | (2006.01) |
| ***B25B 23/16*** | (2006.01) |
| ***B25H 3/00*** | (2006.01) |

(52) U.S. Cl.

CPC .............. *B25B 15/02* (2013.01); *B25B 23/16* (2013.01); *B25H 3/006* (2013.01); *A63B 53/0487* (2013.01); *A63B 2053/0491* (2013.01); *A63B 57/00* (2013.01); *B25B 15/005* (2013.01); *B25B 15/007* (2013.01); *B25B 15/008* (2013.01)

(58) Field of Classification Search

CPC ..... B25B 15/02; B25B 15/005; B25B 15/007; B25B 15/008; B25B 23/16; B25H 3/006; A63B 53/0487; A63B 57/00; A63B 2053/0491

USPC ............................ 81/459, 460; 473/334–339

See application file for complete search history.

(56) References Cited

U.S. PATENT DOCUMENTS

| | | | | |
|---|---|---|---|---|
| 4,867,018 | A * | 9/1989 | Spector | B25B 15/007 81/439 |
| 5,458,026 | A * | 10/1995 | Southard | B25B 27/18 81/53.2 |
| 6,079,298 | A * | 6/2000 | Gasperi | B25G 1/102 81/177.1 |
| 7,614,963 | B2 * | 11/2009 | Cheng | A63B 60/00 81/437 |
| 8,562,457 | B2 * | 10/2013 | Beach | A63B 53/06 473/335 |
| 2022/0040834 | A1 * | 2/2022 | Kukucka | B25B 15/008 |

* cited by examiner

*Primary Examiner* — Hadi Shakeri

(74) *Attorney, Agent, or Firm* — Michael A. Catania

(57) ABSTRACT

A golf club wrench with a bit portion having a plurality of tip features at one end of the bit portion is disclosed herein. The tip features may include threading, a Philips head shape, a flat head shape, a Torx® head shape, and a hex wrench shape. The different tip features on the wrench can be used to engage with both a mechanical fastener and a weight. The wrench may also include a handle contoured to fit within the hand of a golfer. The golf club wrench can be provided in a kit containing weights and mechanical fasteners having engagement features that mate with one or more of the tip features on the wrench.

1 Claim, 4 Drawing Sheets

GOLF CLUB WRENCH WITH MULTI-PURPOSE TIP

CROSS REFERENCES TO RELATED APPLICATIONS

Not Applicable.

STATEMENT REGARDING FEDERALLY SPONSORED RESEARCH OR DEVELOPMENT

Not Applicable

BACKGROUND OF THE INVENTION

Field of the Invention

The present invention relates to a golf club wrench with a multi-purpose tip that is used to adjust features of a golf club, including weight screws.

Description of the Related Art

Prior art golf club wrenches are composed of a handle and a single bit with Phillips, flat head, Torx®, or other shapes at the tip end for the purpose of engaging with a single type of screw or bolt. The usefulness of such prior art wrenches is limited to the type and size of the bit on each individual wrench. Multi-purpose wrenches typically require the replacement of this single bit with a different bit, which can be time consuming and creates the risk of losing bit pieces. Therefore, there is a need for an improved golf club wrench that can be used to adjust features of a golf club.

BRIEF SUMMARY OF THE INVENTION

One aspect of the present invention is a wrench comprising a bit portion comprising a first end with first and second tip features and a second end, and a handle portion at least partially covering the second end of the bit, wherein the first tip feature has a first width and is selected from the group consisting of a Philips head, a flat head, a Torx® head, and a hex wrench, wherein the second tip feature has a second width and comprises threads, wherein the first tip feature is disposed at a terminal end of the first end, wherein the second tip feature is disposed above the first tip feature along the bit, and wherein the first width is less than the second width.

In some embodiments, the bit portion may be composed of a metal material and the handle portion may be composed of a nonmetal material. In a further embodiment, the bit portion may be composed of heat-treated 6150 steel and may further comprise a plating material. In other embodiments, each of the bit portion and the handle portion may have a length of 1 inch to 3 inches, the handle portion may have a width of 0.75 inch to 2 inches, and the handle portion may have a thickness of 0.25 inch to 1 inch. In another embodiment, the handle portion may have at least one curved portion. In yet another embodiment, the first width may be 0.05 inch to 0.25 inch. In any embodiment, the threads may be M4 threads, and in other embodiments, the first tip feature may be a Torx® head. In other embodiments, the first tip feature may have a length of 0.10 inch to 0.35 inch, and the second tip feature may have a length of 0.05 inch to 0.035 inch.

Another aspect of the present invention is a kit comprising a wrench with a bit portion comprising a first end with first and second tip features and a second end and a handle portion at least partially covering the second end of the bit portion, at least one mechanical fastener, the at least one mechanical fastener comprising a head portion with an engagement recess and a threaded extension portion, and at least one weight comprising a body and a through opening, wherein the first end of the bit portion comprises a shape sized to mate with a geometry of the engagement recess, wherein the second tip feature comprises threads, and wherein the through opening comprises internal threads sized to engage with the threads of the second tip end.

In some embodiments, the at least one weight may further comprise a second recess encircling at least a portion of the through opening, which second recess may be sized to receive the head portion of the at least one mechanical fastener. In another embodiment, the kit may further comprise a container sized to hold the wrench, at least one mechanical fastener, and at least one weight. In any embodiments, the bit portion may be composed of a metal material, the handle portion may be composed of a nonmetal material. In other embodiments, the handle portion may have at least one curved portion. In some embodiments, each of the bit portion and the handle portion may have a length of 1 inch to 3 inches, the handle portion may have a width of 0.75 inch to 2 inches and a thickness of 0.25 inch to 1 inch, the first tip feature may have a length of 0.10 inch to 0.35 inch, and the second tip feature may have a length of 0.05 inch to 0.035 inch. In another embodiment, the first tip feature may have a first width of 0.05 inch to 0.25 inch and the second tip feature may have a second width that is greater than the first width.

In some embodiments, the first tip feature may be selected from the group consisting of a Philips head, a flat head, a Torx® head, and a hex wrench. In a further embodiment, the threads of the second tip feature may be M4 threads. In any embodiment, the at least one mechanical fastener may be composed of a metal material, and the at least one weight may comprise a metal material. In a further embodiment, the at least one weight may also comprise a non-metal material. In some embodiments, the at least one mechanical fastener may comprise first and second mechanical fasteners, and the at least one weight may comprise first and second weights.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

Figure 1:
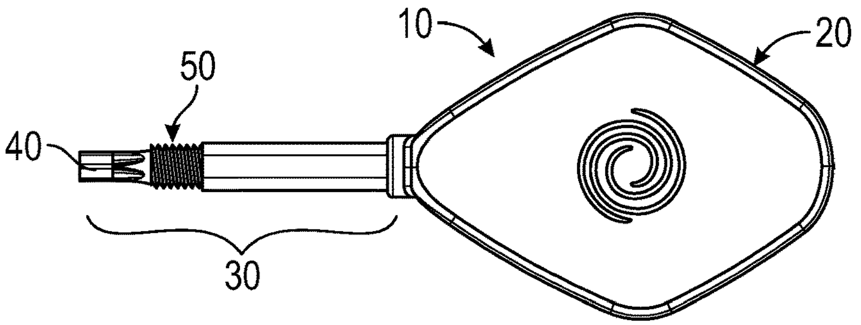
FIGS. 1 and 2 are front plan views of a golf club wrench of the present invention.
Figure 2:
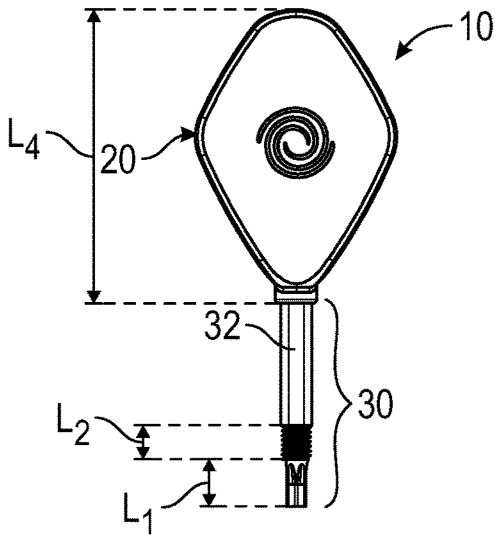

The present invention is directed to a golf club wrench 10 with a handle portion and a bit portion 30 having two different tip features 40, 50 as shown in FIGS. 1-10. The first tip feature 40 is a Torx® shape with a maximum width $W_1$ ranging from 0.05 to 0.25 inch and a length $L_1$ ranging from 0.10 to 0.35 inch, though in other embodiments may have any shape that mates with screws or bolts known to a person skilled in the art. For example, it may be shaped like the tip of a Philips head screwdriver, a flat head screwdriver, a hex wrench, or another shape known to a person skilled in the art.

The second tip feature 50 is made up of threads 52 disposed directly above the first tip feature 40 along the bit portion 30. In the preferred embodiment, the second tip feature 50 has a length $L_2$ ranging from 0.05 to 0.35 inch and a width $W_2$ that is slightly greater than the width $W_1$ of the first tip feature 40 and slightly less than the width $W_3$ of an upper portion 32 of the bit portion 30, which ranges from 0.05 to 0.30 inch. The second tip feature 50 preferably comprises M4 threads 52, but in other embodiments may have any number of threads 52, with any type of thread 52 spacing and sizing. In still other embodiments, the second tip feature 50 may comprise different engagement features other than threading, such as a unique geometry that engages with an internal geometry of another piece.

Figure 3:
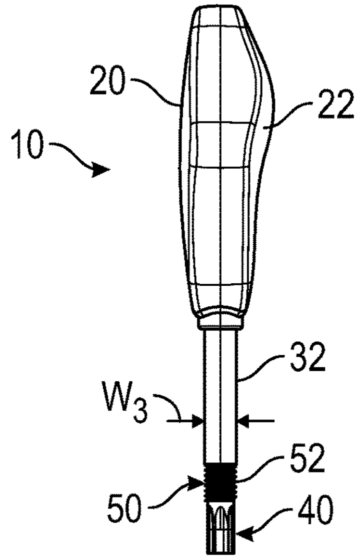
FIG. 3 is a side plan view of the embodiment shown in FIGS. 1 and 2.
Figure 4:
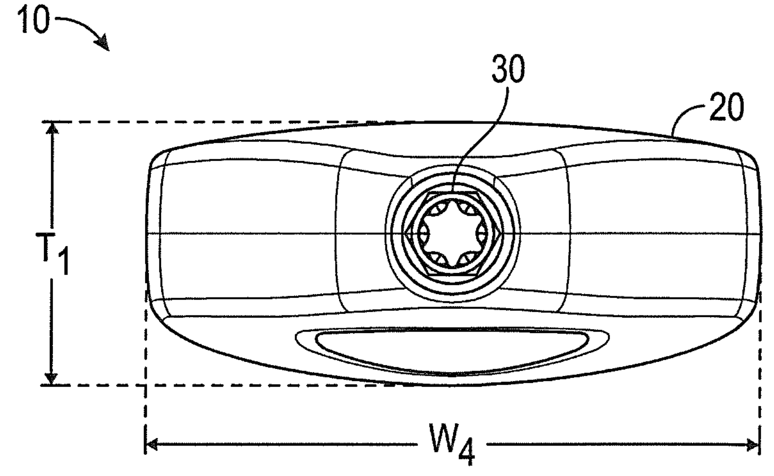
FIG. 4 is a bottom plan view of the embodiment shown in FIGS. 1 and 2.
Figure 5:
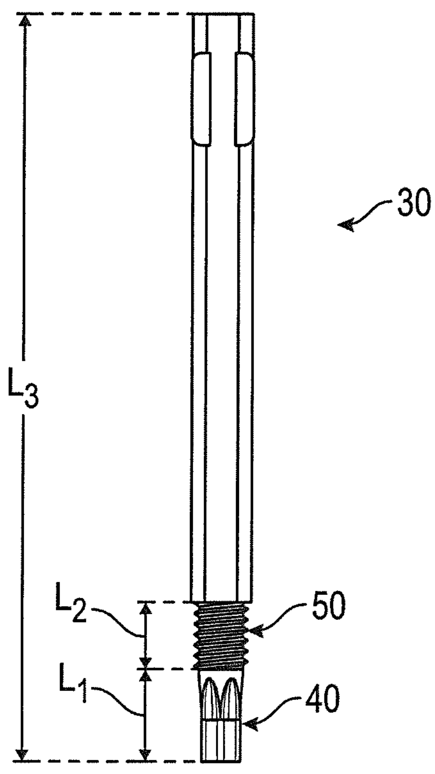
FIGS. 5 and 6 are side plan views of the bit portion of the embodiment shown in FIGS. 1 and 2.
Figure 6:
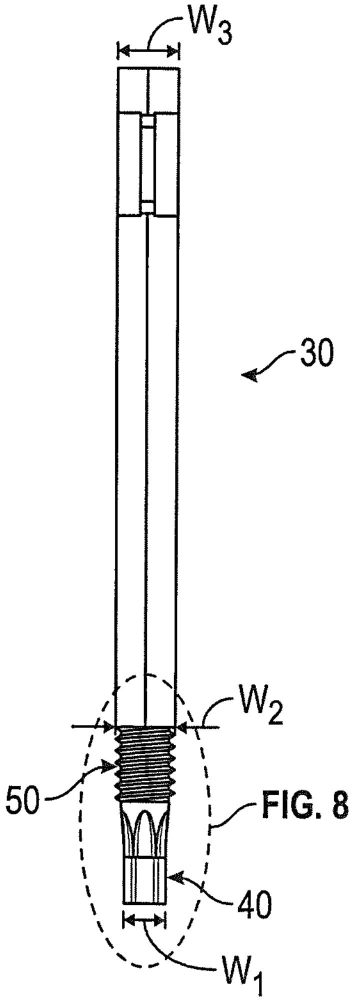
Figure 7:
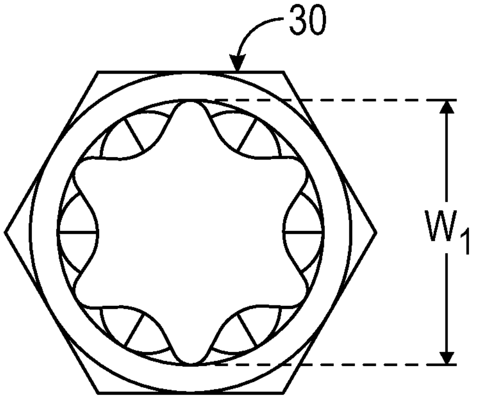
FIG. 7 is a bottom plan view of the embodiment shown in FIGS. 5 and 6.
Figure 8:
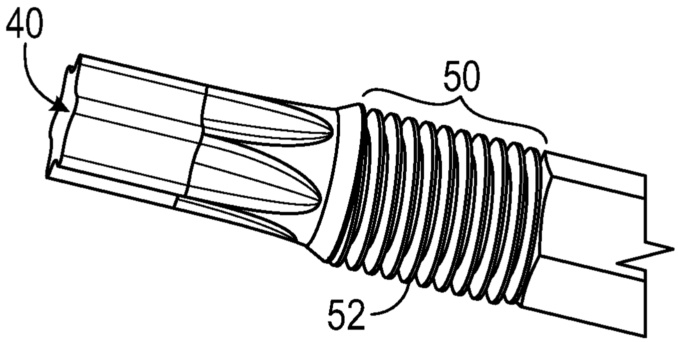
FIG. 8 is a side perspective view of the circled portion of the embodiment shown in FIG. 6.

As shown in FIGS. 5-7, the bit portion 30, which has a length $L_3$ that ranges from 1 to 3 inches, is preferably composed of a metal material such as steel, and more preferably 6150 steel that has been heat treated and finished with a plating material. The handle portion 20, shown in FIGS. 3 and 4, has a length $L_4$, of 1 to 3 inches, a width $W_4$ that ranges from 0.75 inch to 2 inches, and a thickness Ti that ranges from 0.25 to 1.00 inch, and may be composed of any rigid material, but preferably is composed of a plastic or composite. As shown in FIG. 3, the handle portion 20 preferably has contours, including at least one curved portion 22 that can fit comfortably within a user's hand.

Figure 9:
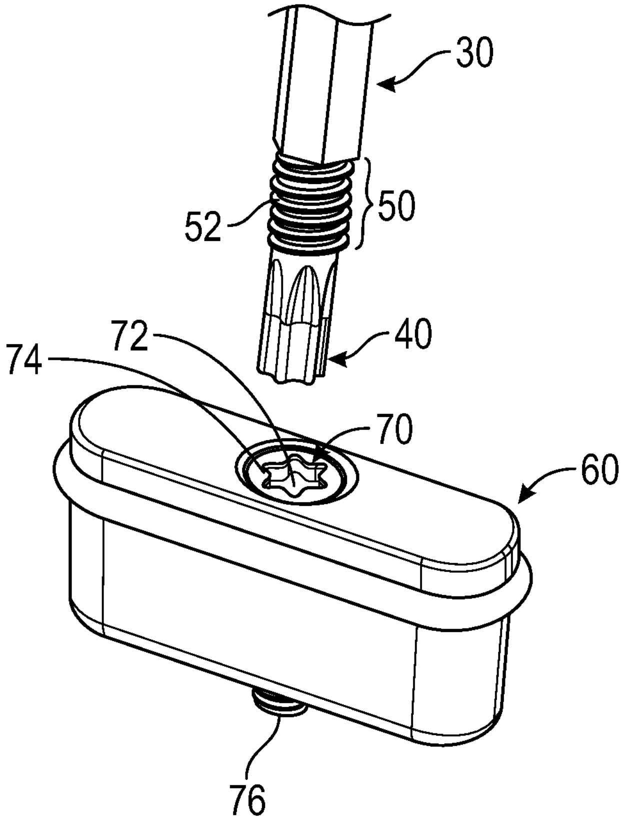
FIG. 9 is a side perspective view of the embodiment shown in FIGS. 1 and 2 proximate a weight and mechanical fastener combination.
Figure 10:
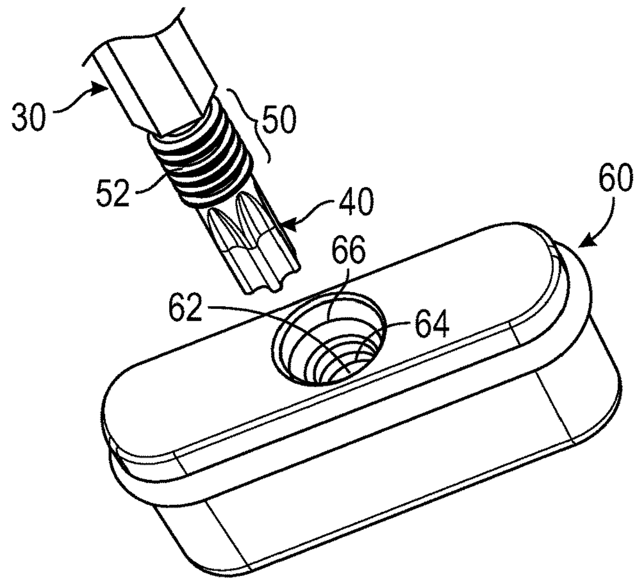
FIG. 10 is a side perspective view of the embodiment shown in FIGS. 1 and 2 proximate a weight.
Figure 12:
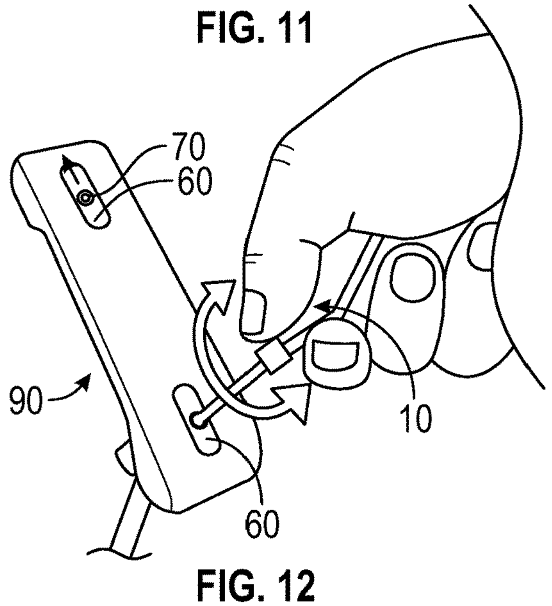
FIG. 12 is an illustration of a golfer engaging the embodiment shown in FIGS. 1 and 2 with a weight and mechanical fastener combination affixed to a golf club head.

The wrench 10 of the present invention is particularly useful for affixing and removing weights 60 engaged with weight ports (not shown) in golf club heads 90, such as the putter head shown in FIG. 12. In this configuration, as shown in FIG. 12, a weight 60 with a through bore 62 and threading 64 in the through bore 62 is placed within a weight port and reversibly secured therein with a mechanical fastener 70, such as a screw or a bolt, having a head portion 74, a threaded extension portion 76, and an engagement recess 72 in the head portion 74. The extension portion 74 extends through the through bore 62 and engages with threading within the weight port (not shown) to fix the weight 60 to the golf club head 90. The different tip features 40, 50 are used to engage with different portions of this weight 60 and mechanical fastener 70 combination. As shown in FIG. 9, the first tip portion 40 is sized to fit within the engagement recess 72 within the head portion 74 of the mechanical fastener 70, so that a user can screw the mechanical fastener 70 into the golf club head 90, thereby securing the weight 60 within the weight port. When the user wishes to remove the weight 60 from the golf club head 90, she can unscrew the mechanical fastener 70 from the golf club head 70 and weight 60 using the same first tip portion 40. The threads 52 of the second tip portion 50 are sized to engage with the internal threading 64 through opening 66 of the through bore 62 in the weight 60, as shown in FIG. 10, so the user can then screw the second tip portion 50 into the through bore 62 of the weight 60 and pull the weight 60 free from the golf club head 90. Since the first tip portion 40 has a slightly smaller width than that of the second tip portion 40, it fits easily within the through bore 62.

Figure 11:
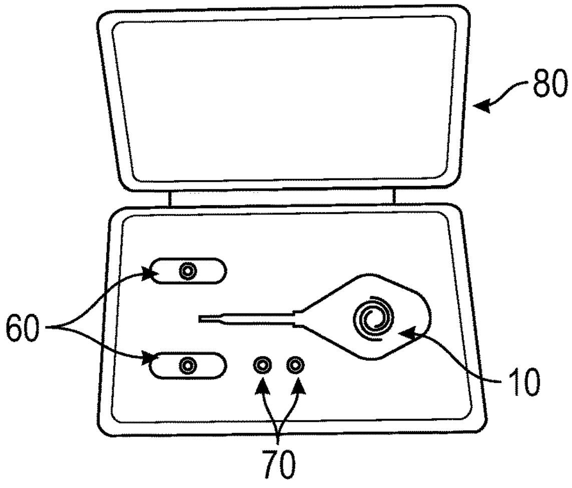
FIG. 11 is a top perspective view of a weight kit comprising the embodiment shown in FIGS. 1 and 2.

The wrench 10 may be provided to golfers on its own, or packaged in a kit 80 comprising a container 85, a plurality of weights 60, and a plurality of mechanical fasteners 70 as shown in FIG. 11 so that golfers can adjust the weighting of their golf clubs as they see fit.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. The section titles included herein also are not intended to be limiting. Therefore, the embodiments of the invention in which an exclusive property or privilege is claimed are defined in the following appended claims.

I claim:

1. A wrench for use with a weight for a golf club head, the wrench comprising:

a bit portion comprising a first end with first and second tip features and a second end, wherein the bit portion has a length of 1 inch to 3 inches, wherein the bit portion is composed of heat-treated 6150 steel and further comprises a plating material; and a handle portion at least partially covering the second end of the bit, wherein the handle portion has a length of 1 inch to 3 inches, wherein the handle portion has a width of 0.75 inch to 2 inches, wherein the handle portion has a thickness of 0.25 inch to 1 inch. and wherein the handle portion has a substantially planar trapezoidal shape, wherein the first tip feature has a first width and is selected from the group consisting of a Philips head, a flat head, a Torx® head, and a hex wrench, wherein the second tip feature has a second width and comprises threads, wherein the first tip feature is disposed at a terminal end of the first end and wherein the first tip feature has a length of 0.10 inch to 0.35 inch, wherein the second tip feature is disposed above the first tip feature along the bit and wherein the second tip feature has a length of 0.10 inch to 0.35 inch, and wherein the first width is less than the second width.

* * * * *